Nov. 17, 1970 W. W. FRITSCHI 3,541,269

ARRANGEMENT FOR MONITORING COMMUNICATION LINES FOR THE PRESENCE OF SIGNALS

Filed Aug. 28, 1967 9 Sheets-Sheet 1

INVENTOR
W. W. FRITSCHI
BY Charles H Davis
ATTORNEY

United States Patent Office 3,541,269
Patented Nov. 17, 1970

3,541,269

ARRANGEMENT FOR MONITORING COMMUNICATION LINES FOR THE PRESENCE OF SIGNALS

Walter W. Fritschi, Atlantic Highlands, N.J., assignor to Bell Telephone Laboratories, Incorporated, Murray Hill, N.J., a corporation of New York Filed Aug. 28, 1967, Ser. No. 663,789
Int. Cl. H04m 3/22
U.S. Cl. 179—18 14 Claims

ABSTRACT OF THE DISCLOSURE

A telephone switching office is disclosed having apparatus for monitoring trunks for the presence of a particular signal such as an annoyance call tracing tone. The trunks are divided into groups and each group is coupled to a signal detector. Upon the detection of a signal in one group, a control circuit successively divides that group into smaller groups and connects the smaller groups to each of the detectors. When the trunk having the signal is found, the identity of the trunk is recorded.

BACKGROUND OF THE INVENTION

Field of the invention

This invention relates to telephone systems and, particularly, to arrangements for detecting signals on telephone lines.

In a more particular aspect, this invention relates to apparatus for monitoring a plurality of communication lines for the presence of a particular tone and recording the identity of a line over which the tone is being transmitted.

In telephone systems, many different signals are transmitted over the communication lines to establish and control the interconnection of customer stations. The signals may be digital signals containing information pertaining to the called station, supervisory signals indicating the status of various units of equipment, special service signals indicating that a customer desires special services, et cetera. As additional service features and improvements are provided in a telephone system, the signaling arrangements become more complex and it becomes increasingly difficult to distinguish legitimate signals from extraneous signals which may be introduced into the system either inadvertently or maliciously.

Furthermore, the need arises in annoyance call tracing arrangements for identifying those communication lines over which a particular tone is being transmitted to indicate that the line is being improperly used for a nuisance call. For example, in many of the known nuisance call tracing arrangements, the annoyed customer causes a tone to be transmitted over the established connection to permit the connection to be traced so that the originator of the call can be identified.

Description of the prior art

While many prior art arrangements for detecting the presence of nuisance call tracing tones and the like are wholly suitable for the intended purposes, these arrangements have certain problems which the present invention solves. For example, many of the prior art signal detecting arrangements use scanning techniques whereby each of the circuits to be monitored is connected to a scanner which interrogates each circuit in sequence. Although scanners of this type can be made to operate at a very fast rate, it is obvious that while one circuit is being interrogated, a tone present on any of the other circuits might go undetected.

SUMMARY OF THE INVENTION

In accordance with the illustrative embodiments of the invention, a plurality of communications circuits is divided into at least two groups and each group is coupled through gating circuitry to a detector which continuously monitors the circuits in that group for the presence of a particular tone. Upon the detection of the tone in one of the groups, that group is identified and a control circuit actuates the gating circuitry to successively divide the identified group into smaller groups and connect each smaller group to a detector. The dividing process continues until the circuit having the tone is found and its identity is recorded.

Thus, it can be seen with the instant invention all communication circuits are under continuous surveillance except during the brief interval after a tone has been detected in one group and that group is being divided into smaller groups for identification of the particular circuit containing the tone.

Since the number of communication circuits in a group being monitored by each detector varies during the dividing process, provisions have been made in one of the embodiments of the invention to alter the selectivity of the detectors in accordance with the group size. Thus, as the group size is reduced, the detectors are made more selective to enable legitimate tones to be distinguished from noise and unwanted tones, e.g., speech simulation of a particular tone.

BRIEF DESCRIPTION OF DRAWING

A better understanding of the arrangement contemplated will be had by the following description made with reference to the drawing, in which.

GENERAL DESCRIPTION

Figures 1, 7:
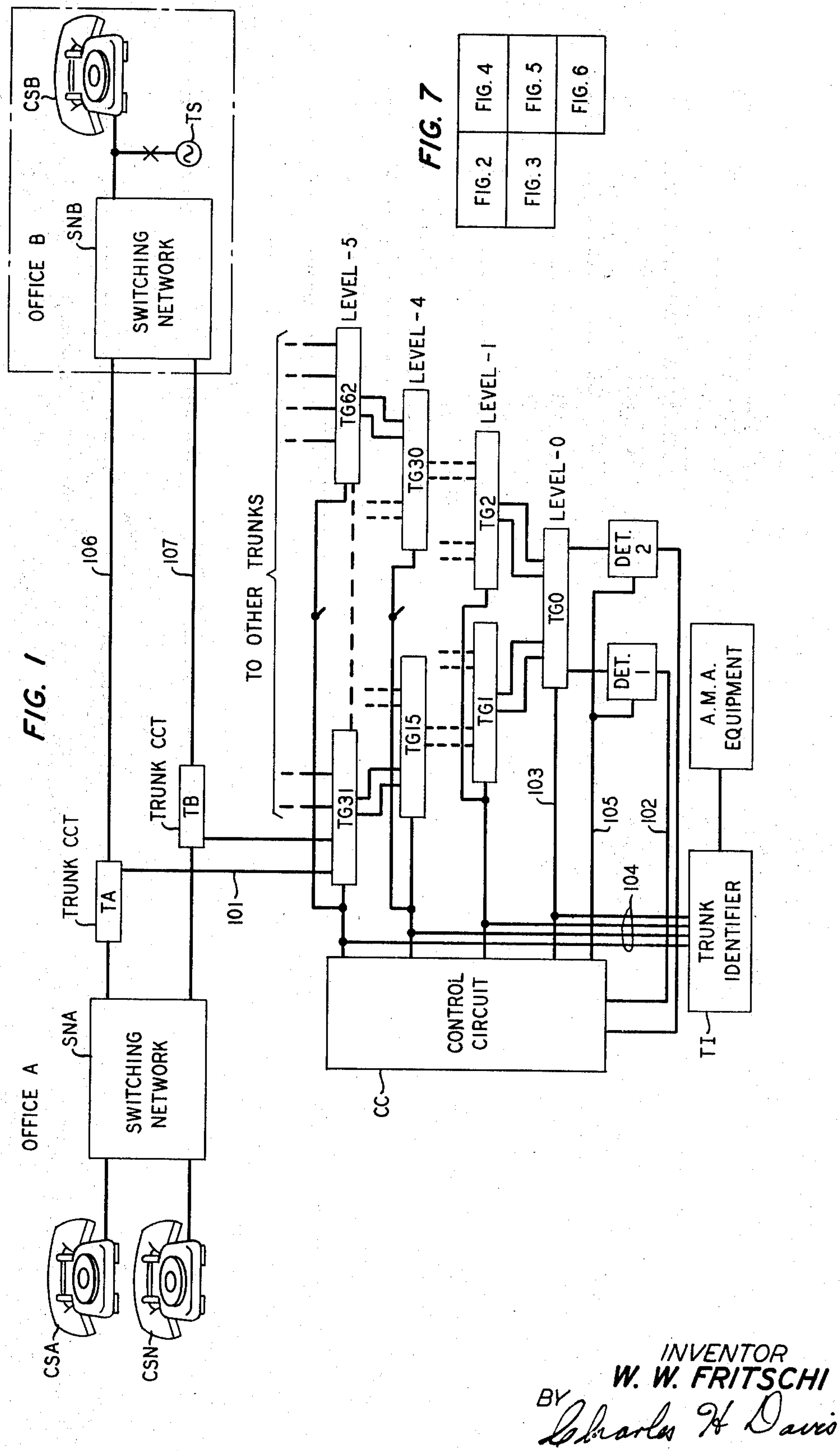
FIG. 1 shows, in block diagram form, the invention functioning to identify nuisance calls in a telephone exchange.

FIG. 1 depicts a portion of a typical telephone system comprising switching offices A and B interconnected by interoffice trunks 106 and 107. Each trunk includes supervisory and signaling circuitry at each office but to simplify the drawing only the trunk circuits TA and TB at switching office A have been shown. Each switching office can be any one of the well-known types and comprises a switching network, such as SNA, for connecting the customer stations CSA and CSN with trunks 106 and 107.

Coupled to the trunk circuits TA and TB at office A is apparatus for monitoring the trunks for the presence of a particular signal. While the apparatus can be connected to different parts of the system to detect many different types of signals, in this embodiment of the invention it is being used to detect the presence of a tone on a trunk indicating that the trunk is being used for making a nuisance call.

The tone monitoring apparatus comprises a plurality of tone gates TG0–TG62, detectors 1 and 2, trunk identifier TI, and control circuit CC. The tone gates TG0–TG62 are arranged in a tree-like matrix with the inputs of tone gates TG31–TG62 being connected to the trunk circuits under surveillance and the outputs of these gates being connected through other gates to detectors 1 and 2 at the output of the matrix.

The tone gates TG0–TG62 are interconnected in such a manner that the trunks connected to tone gates TG31–

TG46 are under continuous surveillance by detector 1 while the trunks connected to tone gates TG47–TG62 are being monitored by detector 2. With the arrangements of gates shown in FIG. 1, 128 trunk circuits can be monitored by two detectors. Of course, it will be obvious to those skilled in the art that the number of gates and detectors can be varied, depending on the needs of a particular system.

In order to briefly illustrate the operation of the system, let it be assumed that a customer at station CSA is making a threatening or annoying call over trunk 106 to a customer at station CSB served by switching office B. When the customer at station CSB determines that the call is of an annoying nature and desires to have the calling station identified, the customer at station CSB causes a tone source TS to be coupled to his line. This source can be coupled to the line in any one of the familiar ways set forth in the prior art.

The tone from source TS will be transmitted through switching network SNB over trunk 106 to trunk circuit TA and over conductors 101 to tone gate TG31. When the tone monitoring apparatus is in its stand-by state, the tone gates are selectively enabled to allow tone on any one of the trunks being monitored to actuate one of the detector circuits. In a case of tone being present on trunk 106, detector 1 will be actuated to transmit a signal over conductor 102 to control circuit CC. Control circuit CC responds by signaling over conductors 103 to selectively disable the right-hand portion of tone gate TG0.

As will be shown subsequently with reference to the detailed FIGS. 2–6, when the right-hand portion of tone gate TG0 is disabled, the trunk group that was initially coupled to detector 2 is disconnected from that detector. In addition, the remaining trunk group that was initially coupled to detector 1 is now divided in half and the halves are reconnected to detectors 1 and 2.

Detector 1 will continue to be actuated by the presence of tone on trunk 106 and detector 1 will signal over conductor 102 to control circuit CC, causing control circuit CC to disable the right-hand portion of tone gate TG1 in the next level of the tone gate matrix. Thus, in response to the detection of a tone in one-half of the trunk group being monitored, the other half of the group will be "gated off" and the group in which the tone is detected will be subsequently divided in half and reconnected to the two detectors. The gating process continues until each detector is connected to a single trunk and the identity of the trunk having the tone is ascertained.

As the various gate circuits are disabled, the signals are also transmitted over conductors 104 to trunk identifier TI which registers the identity of the trunk containing the nuisance call tracing tone. This identity is then recorded by any suitable means, such as the automatic message accounting equipment, which is normally used for recording toll ticketing information.

In this illustrative embodiment of the invention, a maximum of 128 trunks can be monitored simultaneously with 64 trunks initially coupled to each of the two detectors. The selectivity of the detectors is set accordingly to compensate for the large group of trunks. As the groups are divided into smaller groups, a signal is transmitted over conductor 105 to change the selectivity of the detectors so that the nuisance call signal can be distinguished from noise and other extraneous signals.

DETAILED DESCRIPTION

In order for the reader to gain a better appreciation of the nature and scope of the problems solved by my invention, a more detailed description of the first embodiment of the invention now will be given with respect to FIGS. 2–6.

Figure 2:
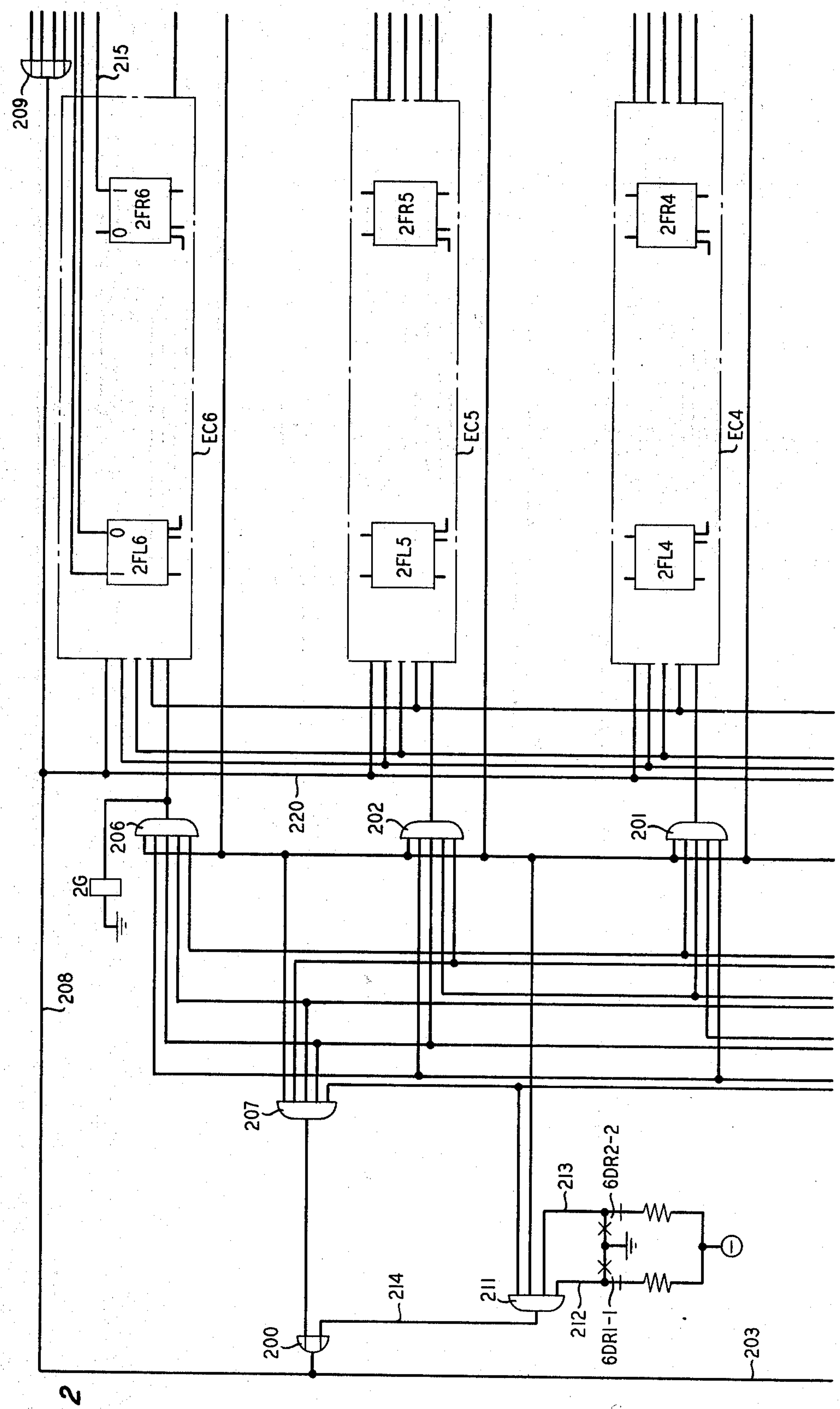
FIGS. 2–6 when arranged in accordance with FIG. 7 show a more detailed disclosure of one embodiment of the invention set forth in FIG. 1.
Figure 3:
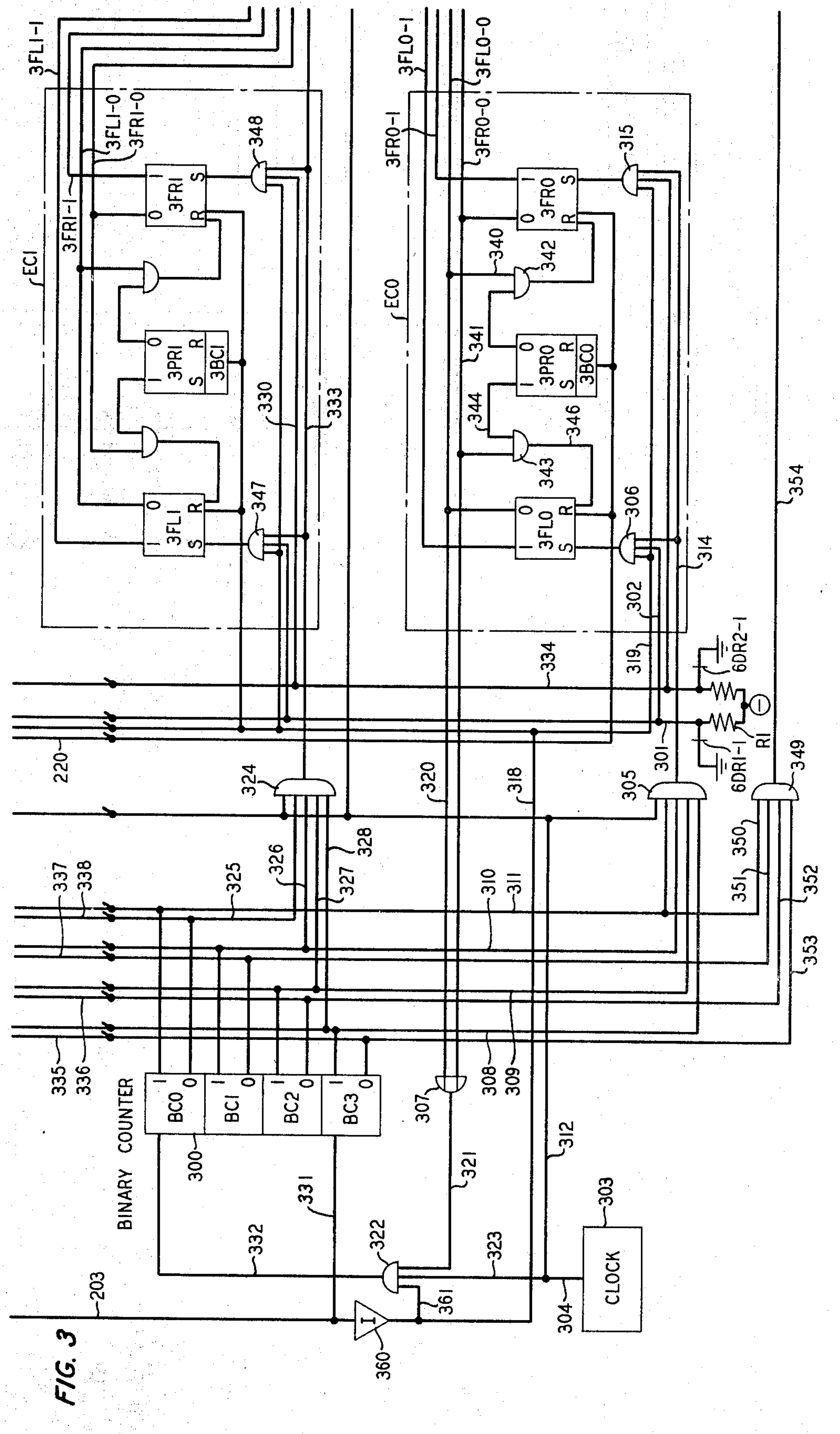
Figure 4:
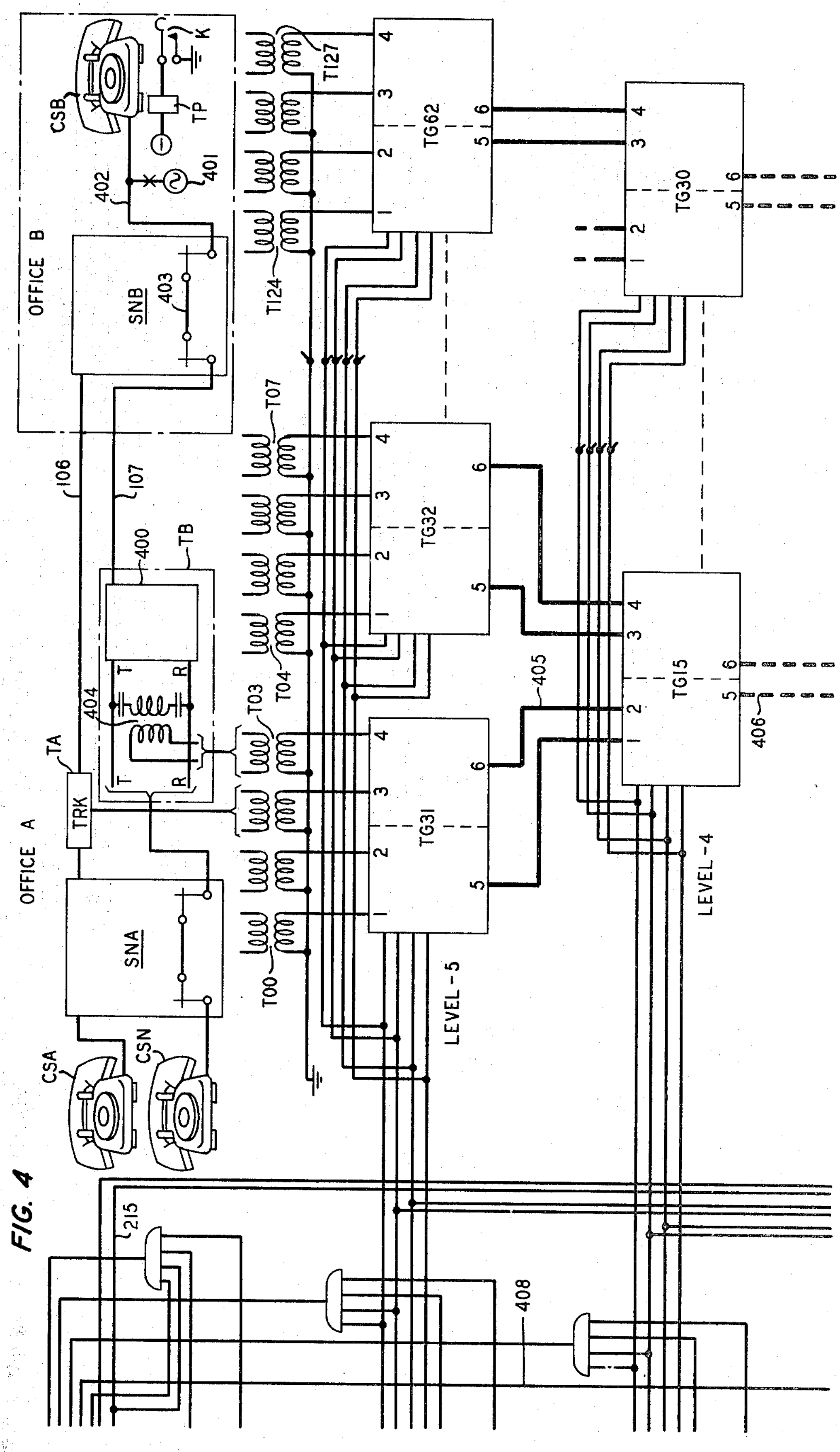

FIGS. 2–6, when arranged in accordance with FIG. 7, show in more detail an arrangement similar to that depicted in FIG. 1. FIG. 4 shows the switching offices A and B with their respective customer stations CSA, CSN, and CSB. Interconnecting offices A and B are trunks 106 and 107. Trunks 106 and 107 are terminated in trunk circuits at each office but only the trunk circuits TA and TB have been shown at switching office A. The trunk circuits generally include control and supervisory circuitry, such as 400, for transmitting and receiving signals between the offices. The trunk circuits also afford a suitable place for monitoring for the presence of a particular signal such as a call tracing tone. It will be obvious, however, that if other signals are to be monitored, connections can be made at other points in the system.

Each of the trunk circuits to be monitored is coupled through one of the transformers T00–T127 to one of the four input terminals of tone gates TG31–TG62. For example, trunk circuit TB is coupled via transformer T03 to input terminal 4 of tone gate 31. The output terminals 5 and 6 of tone gates TG31 and TG32 are connected to the input terminals 1–4 of tone gate TG15 and the output terminals 5 and 6 of tone gate 15 are connected through other gates TG7 and TG3 (not shown). In other words, the tone gates are arranged in six levels to form a matrix having a plurality of inputs at tone gates TG31–TG62 and two outputs at tone gate TG0. The output terminals 5 and 6 of tone gate TG0, which are the outputs of the matrix, are coupled to detectors 1 and 2 in FIG. 6.

Figure 5:
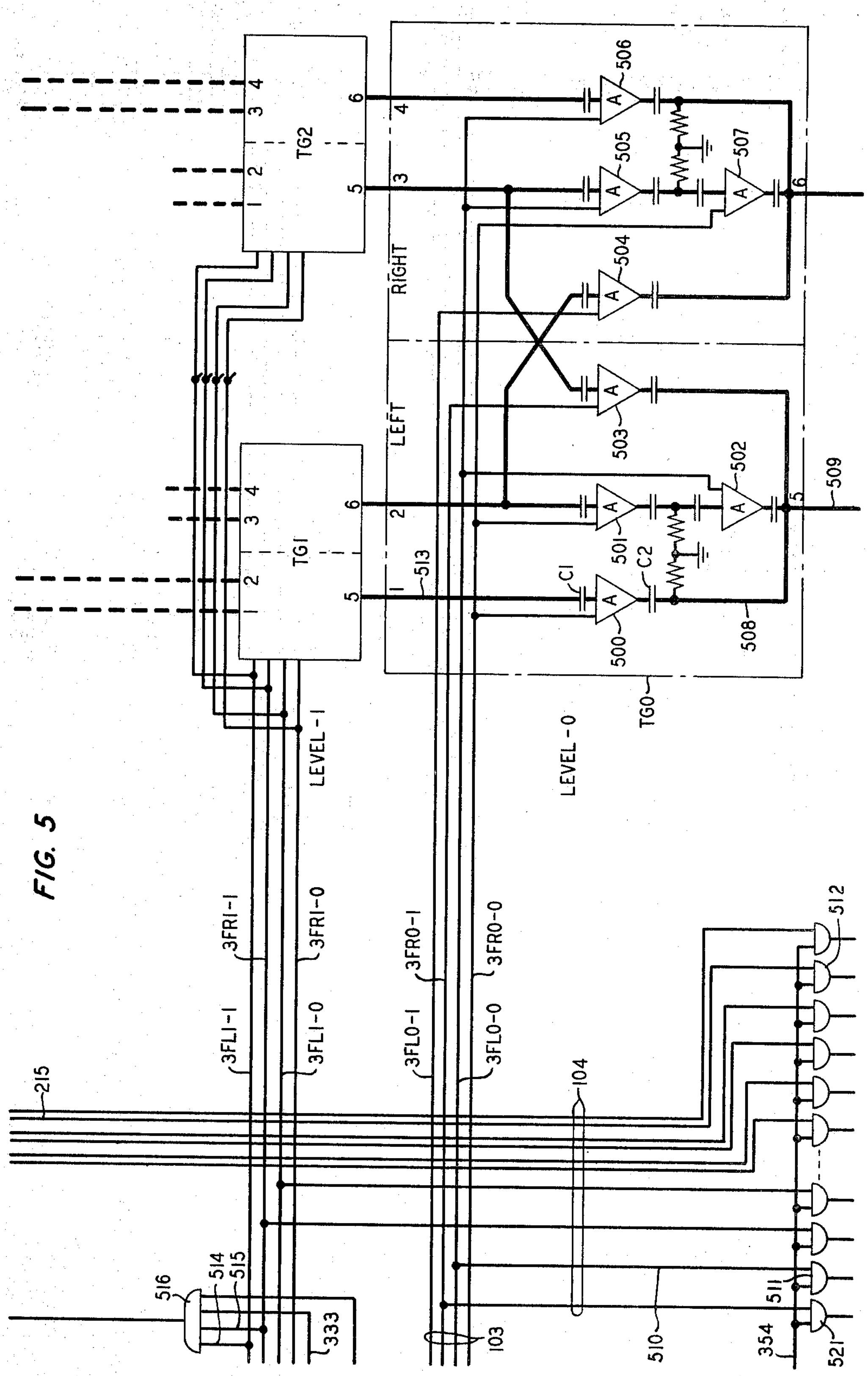

Each tone gate circuit in the matrix comprises a plurality of gated amplifiers interconnected as set forth in tone gate TG0 of FIG. 5. The term "gated amplifier" is used herein to describe a well-known circuit which selectively controls the passage of alternating-current signals by the application of direct-current signals. The amplifiers in this embodiment of the invention are selectively enabled and disabled by direct-current signals from the control circuitry shown in FIGS. 2 and 3. Thus, when the arrangement is in its stand-by condition and monitoring all trunks, tone transmitted on any one of the trunks connected to the input transformers T00 through T63 will actuate detector 1 and tone applied to the input transformers T64 through T127 will actuate detector 2. By selectively enabling and disabling amplifiers in tone gate TG0, the tone output from one-half of the trunks will be blocked and the remaining trunks will be divided into two smaller groups with each of the smaller groups being coupled to one of the detectors.

The control circuit, shown in FIGS. 2 and 3, comprises a plurality of enabling circuits EC0–EC6, with each of enabling circuits EC0–EC5 being associated with tone gates in a corresponding level of the tone gate matrix shown in FIGS. 4 and 5. For example, enabling circuit EC0 is associated with tone gate TG0 in level 0, enabling circuit EC1 is associated with tone gates TG1 and TG2 in level 1, et cetera. The enabling circuits EC0–EC6, under control of the binary counter 300 and the output of detectors 1 and 2, will selectively enable and disable the amplifiers in the various tone gates TG0–TG62 to divide and subdivide the trunks into smaller groups until the one trunk having the tone is located and identified.

Each enabling circuit comprises two gating flip-flops FR– and FL– and a priority flip-flop PR–. The gating flip-flops for enabling circuit EC0 are designated 3FL0 and 3FR0. When the left gating flip-flop 3FL0 is set, it disables gating amplifiers 505 and 506 to block the two inputs 3 and 4 on the right half of tone gate TG0 from the output terminal 6. In addition, flip-flop 3FL0 when set will disable amplifier 502 and enable amplifier 504 to steer the input on terminal 2 of tone gate TG0 to the output terminal 6. Conversely, if the right gating flip-flop 3FR0 of enabling circuit EC0 were set instead of flip-flop 3FL0, amplifiers 500, 501, and 507 would be disabled and amplifier 503 would be enabled so that the input to terminal 1 and 2 of tone gate TG0 would be blocked and any tone input to terminal 3 would be steered to the output terminal 5. In other words, when a left flip-flop such as 3FL0 is set the trunks coupled through the right half of the corresponding tone gate TG0 are "gated off" and when the right flip-flop 3FR0 is set, the trunks coupled through the left half of tone gate TG0 are "gated off." The trunks that remain are divided in half and each half is coupled to a detector.

Depending on the setting of a priority flip-flop such as 3PR0, the left or right gating flip-flop will be preferred if tone is simultaneously detected in both halves of the trunk group. Priority flip-flop 3PR0 is, therefore, associated with a binary cell 3BC0 which alters the preference for each usage of the equipment.

The logic circuits employed in this embodiment of the invention have not been set forth in detail since the precise details of these circuits are not important for a complete understanding of the present arrangement. Instead, symbols have been used to represent well-known logic circuits and it will be obvious to one skilled in the art what circuitry can be used in place of the various symbols.

In this embodiment, gate circuits such as 305 and 306 in FIG. 3 are AND gates and are enabled when all inputs are at a negative potential. When enabled, these gates change from ground to a negative potential at their outputs. Gates such as 200 in FIG. 2 and 307 in FIG. 3 are OR gates and change from ground to a negative potential at their output terminals when any one of their input terminals is at a negative potential.

Flip-flops such as 3FL0 are bistable memory cells which require a negative pulse on their "S" and "R" input terminals to "set" and "reset" the device. In its reset state, the "1" output is at a negative potential and the "0" output is at ground, while in its set state the "0" output is negative and the "1" output is at ground.

Flip-flops such as 3PR0 are bistable memory cells coupled to a steering gate 3BC0 making the device function as a single stage binary counter which changes state with each positive going input pulse.

When the arrangement is in its normal or stand-by state, all left and right gating flip-flops FL– and FR– are in their reset condition so that tone gate amplifiers corresponding to amplifiers 500, 501, 502, 505, 506, and 507 are enabled in each of the tone gates TG0–TG62. With these amplifiers enabled, the inputs to terminals 1 and 2 of each tone gate are directed to output terminal 5 of the gate and the inputs to terminals 3 and 4 of each tone gate are directed to output terminal 6 of the gate. In addition, binary counter 300 has been reset and the priority flip-flop PR– have all been either set or reset from the last trunk identifying operation. For the purpose of this description, it will be assumed that all priority flip-flops are in their reset state.

When binary counter 300 is reset all four of its stages supply negative potential on their "1" outputs over conductors 308–311 to partially enable AND gate 305. AND gate 305 is fully enabled with the next clock pulse over conductors 304 and 312, and when enabled the output of gate 305 partially enables AND gates 306 and 315.

Figure 6:
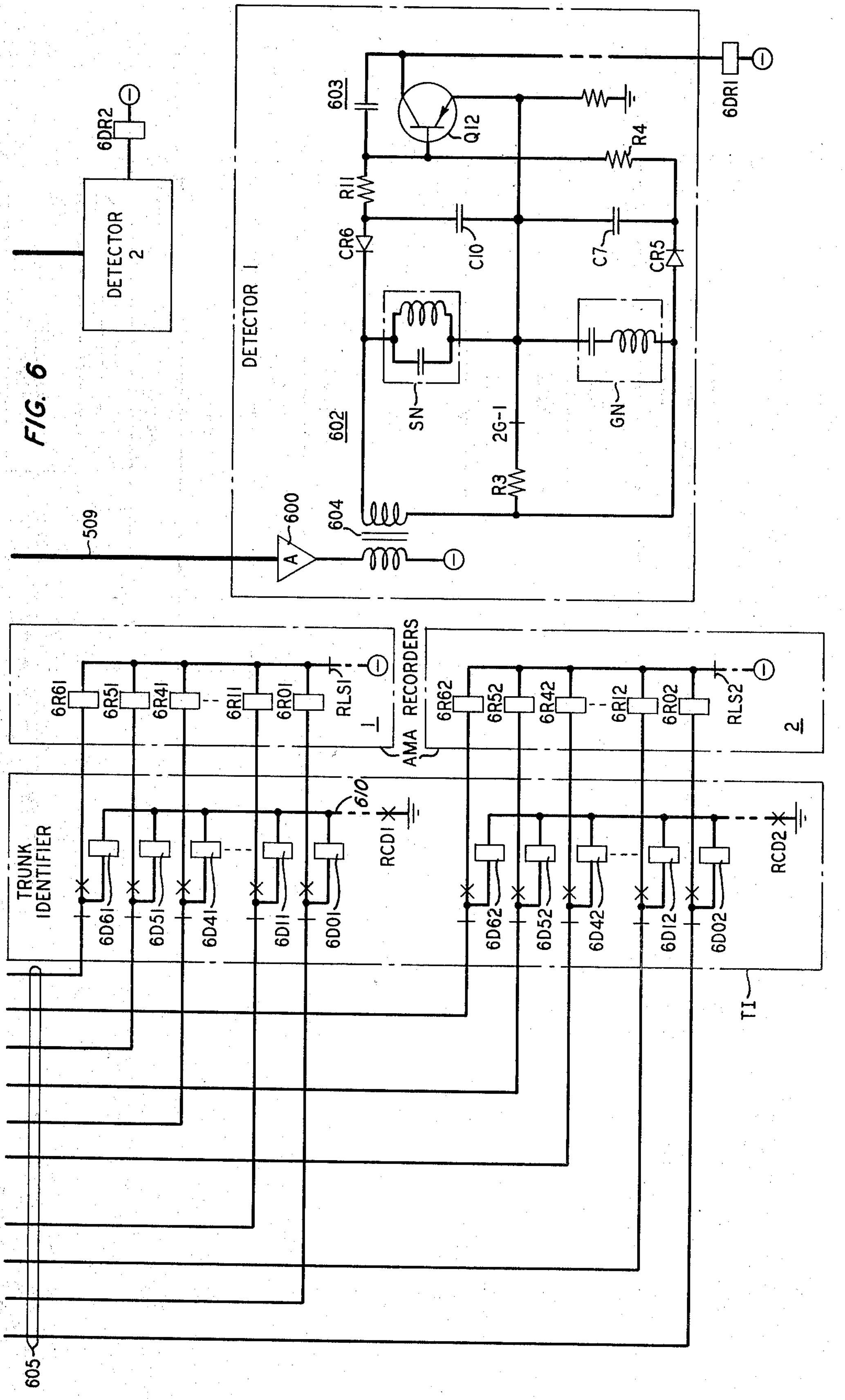

In addition to controlling the gating amplifiers in the tone gates, the output conductors of enabling circuits EC0–EC6 are also extended over conductors 104 to trunk identifier TI in FIG. 6. As each enabling circuit sends gating signals to enable and disable amplifiers in the tone gates TG0–TG62, the same signals will be sent over conductors 104 to subsequently energize registration relays D– in trunk identifier TI. At the end of the scanning cycle, the relays D– in trunk identifier TI. At the end of the scanning cycle, the relays D– are operated by a gating pulse to identify the particular trunk over which the tone was received.

To illustrate the operation of the system, let it be assumed that the customer at station CSN has placed an annoying call over trunk 107 to the customer at station CSB. Realizing that this is a nuisance call and not knowing the origin of the call, the customer at station CSB wishes to have the calling station identified. To begin the identification process, the party at station CSB actuates key K to operate trap relay TP over an obvious path. With relay TP operated, tone source 401 is connected to the called line conductors 402, over network connection 403 and back over trunk conductors 107 to the trunk relay equipment 400 at switching office A. The tone will appear on the T and R transmission conductors of the trunk and pass through transformer 404 over an obvious path to the primary winding of input transformer T03. The secondary winding of transformer T03 is connected to the input terminal 4 of tone gate TG31.

With the arrangement in its stand-by state, that is, when all trunks are under continuous surveillance, the gating amplifiers in all tone gates are selectively enabled to that an input to terminals 1 and 2 of any gate will be gated to output terminal 5 of that gate and an input to terminals 3 and 4 of any gate will be gated to output terminal 6 of the same gate. The tone being transmitted over the nuisance call connection to input terminal 4 of tone gate TG31, in the instant case, will be gated to output terminal 6 of tone gate 31. From output terminal 6, the tone is transmitted over line 405 to input terminal 2 of tone gate TG15 which gates the tone to its output terminal 5. From the output terminal 5 of tone gate 15, the tone is transmitted over line 406 and through other tone gates (TG7 and TG3, not shown) to the input terminal 1 of tone gate TG1 in FIG. 5. Tone gate TG1 transmits the tone to its output terminal 5 which is connected to the input terminal 1 of tone gate TG0. The tone is transmitted over line 513, through capacitor C1, amplifier 500, and capacitor C2, and over lines 508 and 509 to detector 1.

Detectors 1 and 2 are assumed to be identical and can be any one of the many types which respond to a particular tone to operate a bistable device such as a relay. One example of such a detector is found in the receiver portion of the single frequency signaling circuit disclosed in the United States Pat. 2,642,500 to W. W. Fritschi et al. of June 16, 1953 and also described in the article "Inband Single Frequency Signaling" by A. Weaver and N. A. Newell published in 1954 in volume 33 of the Bell System Technical Journal.

The detector circuitry shown in FIG. 6 of the instant drawing is a simplified diagram of the receiver portion of signaling circuitry shown in more detail in the above-mentioned references. As described in more detail in the references, the detector comprises an amplifier-limiter input stage 600, a signal and guard detector stage 602, and a direct-current amplifier stage 603 for driving detector relay 6DR1.

Tone received over line 509 from the tone gate matrix is amplified or limited by amplifier-limiter stage 600 and passed through transformer 604 to the signaling and guard detector stage 602. The signaling and guard detector stage 602 comprises a signaling channel including signaling network SN which is antiresonant at the particular frequency being detected (in this case the nuisance call tracing tone) and a guard channel including a guard network GN which is series resonant at the same frequency. The term "guard" as used herein and in the references cited above, refers to signals present on the trunk other than the signal being detected and, in this case, the signal being detected is a nuisance call tracing tone.

Thus, the currents from the nuisance call tracing tone build up voltages across the signaling network while other frequencies, such as speech and noise, build up voltages across the guard network. These voltages are rectified separately by diodes CR6 and CR5 and applied across capacitors C7 and C10. The ratio of signal to guard energy can be altered by the operation of relay 2G whose contacts 2G–1 are shown in detector 1. When relay 2G is normal, resistance R3 is connected across the guard network GN to make the guard channel less efficient thus making the signaling channel responsive to a wider range of frequencies. With relay 2G operated, on the other hand, the signaling channel is made more selective and the guard channel is made more efficient. Due to the relative values of resistances R4 and R11 and with relay 2G operated, almost pure nuisance call tracing tone is required to trigger transistor Q12 to operate detector relay 6DR1.

During the monitoring stage when all trunks are under surveillance, relay 2G is released and both detectors are in their wideband state to permit the detection of the nuisance call tone in the presence of a mixture of speech from many simultaneous trunk connections. The value of resistance R3, of course, can be selected to produce the desired degree of selectivity.

Returning now to the description of the identifying operation, it will be recalled that call tracing tone is being transmitted through the matrix and over line 509 to detector 1. Receipt of the call tracing tone by detector 1, operating in its wideband state, will cause relay 6DR1 to operate. When detector relay 6DR1 operates, it actuates its contacts 6DR1–1 in FIG. 3 to disconnect ground from conductors 301 and 302 and negative potential is transmitted through resistor R1 over these conductors to fully enable AND gate 306 unless inhibited by a ground pulse on conductor 319. A ground pulse appears on conductor 319 from inverter 360 during the interval when the arrangement is being reset to inhibit gates 306 and 315 in enabling circuit EC0 and similar gates in the other enabling circuits to prevent the gating flip-flops from being set during a reset cycle. The output from the enabled gate 306 sets flip-flop 3FL0. With flip-flop 3FL0 set, ground is transmitted over conductor 3FL0–1 to enable gating amplifier 504 and negative potential is transmitted over conductor 3FL0–0 to disable amplifiers 502, 505, and 506.

When disabled, amplifiers 505 and 506 block any response to tone being received at the input terminals 3 and 4 of tone gate TG0. This effectively divides the trunk group in half and blocks any tone on the trunks connected to the input of the matrix via tone gates TG47–TG62 from actuating detector 2. When amplifier 502 is disabled and amplifier 504 is enabled by flip-flop 3FL0, the other half of the trunk group connected to tone gates TG31–TG46 is divided in half with the trunks that are connected to tone gates TG31.TG38 being coupled through the matrix to detector 1 and the trunks connected to tone gates TG39–TG46 being coupled through the matrix to detector 2.

The negative potential on conductor 3FL0–0 is also extended over conductor 510 to partially enable AND gate 511 and prepare an operating path for relay 6D01 in trunk identifier T1 when AND gate 349 is enabled. A similar signal is sent by flip-flop 3FR0 in its reset state to partially enable AND gate 521 to prepare an operating path for relay 6D02.

When flip-flop 3FL0 in enabling circuit EC0 was set, it also transmitted a ground pulse over conductor 320 to enable OR gate 307. The enabled OR gate 307 applies a negative potential over conductor 321 to partially enable AND gate 322. With negative potentials on conductor 321 from OR gate 307, AND gate 322 is fully enabled by the next negative clock pulse transmitted by clock 303 over conductors 304 and 323. When enabled AND gate 322 transmits a negative pulse over conductor 332 to start binary counter 300.

Binary counter 300 is a four-stage binary counter driven by the pulses from clock 303 and provides the timing for the control circuit. The binary counter is normally at rest and begins counting when flip-flop 3FL0 or 3FR0 becomes set due to the presence of tone on one of the trunks in the trunk group being monitored. With each pulse counted, the potentials are altered on the eight output terminals ("0" and "1" output terminals for each of the four stages) to control gates 349, 324, 201, 202, 206, and other gates not shown which are associated with enabling circuits EC2 and EC3. The binary counter is automatically reset at the end of the scanning cycle or when a particular tone gate is actuated and no tone is detected in that half of the trunk group remaining connected to the detector after the other half of the trunk group is gated off. This latter feature will be described in more detail below.

Returning now to the description of the operation of the system, it will be remembered that nuisance call tracing tone is being transmitted over trunk 107, detector 1 had operated, and enabling circuit EC0 had been actuated to gate off the half of the trunk group connected to the inputs of tone gates TG47–TG62.

When binary counter 300 counts the first clock pulse, its first stage is set applying a negative potential over conductor 325 and a ground potential to conductor 311. The ground on conductor 311 disables AND gate 305 and the negative potential on conductor 325 together with the negative potentials on conductors 326, 327, and 328 due to the "1" outputs of the last three stages of the binary counter 300 fully enable AND gate 324 coincident with the next negative clock pulse on conductors 304 and 312. The negative output of the enabled gate 324 partially enables AND gates 347 and 348 in enabling circuit EC1. Since the trunk 107 having the call tracing tone is coupled through the tone gates to detector 1, relay 6DR1 will be operated. With relay 6DR1 operated, AND gate 347 in enabling circuit EC1 will be enabled to set flip-flop 3FL1. With flip-flop 3FL1 set, signals are sent over conductors 3FL1–1 and 3FL1–0 to selectively enable and disable gating amplifiers in tone gates TG1 and TG2. The output of tone gate TG2 has been blocked by the disablement of amplifiers 505 and 506 in tone gate TG0. The actuation of gating amplifiers in tone gate TG2, therefore, has no effect at this time. In tone gate TG1, however, various amplifiers are actuated to block the input terminals 3 and 4 of tone gate TG1 and to couple input terminal 1 to output terminal 5 and input terminal 2 to output terminal 6 of tone gate TG1. By blocking input terminals 3 and 4 of tone gate TG1, the trunks connected to the inputs of the matrix at tone gates TG39–TG46 are gated off and the trunks coupled to the inputs of tone gates TG31–TG38 are divided in half with each half being connected to one of the detectors. More specifically, the trunks coupled to tone gates TG31–TG34 are coupled via the matrix to detector 1 and the trunks connected to tone gates TG35–TG38 are coupled via the matrix to detector 2.

Upon receipt of the next clock pulse over conductors 304 and 323, binary counter 300 will advance to enable an AND gate similar to gates 324 and 305 but associated with enabling circuit EC2 (not shown). With this AND gate enabled and detector relay 6DR1 operated, the left flip-flop in enabling circuit EC2 will be set to gate off the trunks coupled to tone gates TG35–TG38. The remaining trunks which are coupled to tone gates TG31–TG34 are divided in half with those trunks connected to tone gates TG31 and TG32 being coupled to detector 1 and those trunks connected to tone gates TG33 and TG34 being coupled to detector 2.

Detector 1 will continue to detect the nuisance call tracing tone on trunk 107 and upon receipt of the next clock pulse, an AND gate similar to AND gates 324 and 305 but associated with enabling circuit EC3 (not shown) will be enabled. This AND gate in combination with the actuated detector 1 will set the flip-flop in enabling circuit EC3 and cause the gating amplifiers in tone gate TG7 (not shown) to gate off the trunks connected to tone gates TG33 and TG34 and divide the remaining trunks in half with the trunks connected to tone gate TG31 being coupled to detector 1 and the trunks connected to tone gate TG32 being connected to detector 2.

With the next clock pulse from clock 303, AND gate 201 is enabled to set the left flip-flop 2FL4 in enabling circuit EC4. Flip-flop 2FL4 selectively enables the gating amplifiers in tone gate TG15 to block any tone from the trunks connected to tone gate TG32. The remaining trunks connected to tone gate TG31 are divided in half with the trunks connected to the input terminals 1 and 2 of tone gate TG31 being coupled to detector 1 and the trunks connected to the input terminals 3 and 4 being coupled to detector 2.

Trunk 107 which has the call tracing tone is connected to input terminal 4 of tone gate 31 and will now cause detector 2 to be actuated and detector 1 and relay 6DR1 will be released. Detector 2 operates relay 6DR2 in FIG. 6 and relay 6DR2 opens its contacts 6DR2–1 in FIG. 3 to disconnect ground from conductor 334. With the ground removed from conductor 334, negative potential is supplied over conductor 334 to partially enable an AND gate in enabling circuit EC5 similar to gate 315 in enabling circuit EC0. This gate in enabling circuit EC5 is fully enabled to set the right gating flip-flop 2FR5 by the output of AND gate 202 when the binary counter 300 advances to enable AND gate 202.

With flip-flop 2FR5 set, the gating amplifiers in tone gate TG31 are selectively enabled to gate off the two trunks connected to the input terminals 1 and 2. Trunk circuit TA which is connected to terminal 3 of tone gate TG31 now will be coupled to detector 1 and trunk circuit TB will be coupled to detector 2.

Up to this point, the detectors 1 and 2 have been operating in their wideband range to permit the detection of the nuisance call tracing tone in the presence of a mixture of speech from many simultaneous connections. However, when binary counter 300 advances with the next clock pulse, AND gate 206 is enabled to operate relay 2G. When relay 2G operates, it actuates its contacts 2G–1 and other contacts not shown in FIG. 6 to make both detectors 1 and 2 more selective so that a legitimate nuisance call tracing tone can be distinguished from noise and speech simulated tone.

Detector 2 will continue to be operated by the tone on trunk 107 and with detector 2 operated and AND gate 206 enabled, flip-flop 2FR6 in enabling circuit EC6 will be set. The output of flip-flop 2FR6 will transmit a ground signal over conductor 215 to disable AND gate 512 in FIG. 5 to prevent relay D62 in the trunk identifier of FIG. 6 from operating. The detectors will remain coupled to trunks 106 and 107 and remain in their high guard condition during the next several counts of binary counter 300 to make sure that the tone is a legitimate tone and not a momentary spurious tone burst on the trunks. More specifically, in this illustrative embodiment, the detectors will remain coupled to these two trunks during the next eight clock pulses, after which the first stage of binary counter 300 will be in its reset state while the last three stages will be set. At this time negative potentials are transmitted over conductors 350–353 to enable AND gate 349. AND gate 349 signals over conductor 354 to enable AND gates such as 511, 521, and other similar gates associated with enabling circuits EC1–EC5 in accordance with the signals being transmitted from the left and right gating flip-flops of each enabling circuit. These signals apply a coded pattern of signals over conductors 605 to operate various relays 6D01–6D62 in trunk identifier TI.

The trunk identifier TI comprises two sets of registration relays 6D01 through 6D61 and 6D02 through 6D62. Each set of registration relays is capable of storing the seven bit word of the trunk identity as it is transmitted over conductors 605, but only one set of registration relays will be actuated depending upon which of relays RCD1 or RCD2 is operated. Relays RCD1 and RCD2 are operated under control of a preference circuit (not shown) to permit entry of the trunk identities on tw different recorders.

Let it be assumed that recorder 1 is being preferred and relay RCD1 is operated to connect ground to conductor 610. With ground on conductor 610 and battery connected to certain of the conductors 605, relays 6D01, 6D11, 6D21, 6D31 and 6D41 operate and complete a path to corresponding relays 6R– in recorder 1 indicating that the call tracing tone was detected on trunk 107 which is connected to input terminal 4 of tone gate TG31.

The automatic message accounting recorder equipment is actuated in a well-known manner and records the information on a suitable medium such as a punched paper tape. After the trunk identity has been recorded, relay RLS1 in recorder 1 operates to release the identifier in preparation for identifying other trunks. The operation of a typical automatic message accounting system is described in more detail in U.S. Pat. 2,688,658 to W. W. Carpenter et al. of September 7, 1954.

Once the trunk identity is recorded in the trunk identifier, the arrangement can be reset and restored to its stand-by state to continuously monitor the trunk group. Should a delay be encountered in recording a trunk identity because the automatic message accounting equipment is busy recording toll ticketing information, the other set of registration relays 6D02 through 6D62 can be used in conjunction with recorder 2.

While the trunk identity is being recorded, the binary counter 300 advances an additional step so that all of its stages are now set. With all stages of binary counter 300 set, negative potential will be transmitted over conductors 335–338 to enable AND gate 207. AND gate 207 enables OR gate 200 which transmits a reset pulse over conductors 203 and 331 to reset all stages of binary counter 300. The reset pulse is inverted by inverter 360 and the output of inverter 360 disables AND gate 322 to block further clock pulses from binary counter 300. When binary counter 300 is reset, AND gates, such as gate 200, are disabled releasing relay 2G and restoring the detectors to their wideband state. OR gate 200 when enabled also sends a reset signal over conductors 208 and 215 to reset all left and right flip-flops in enabling circuits EC0–EC6. In addition to resetting the left and right flip-flops, this reset pulse will also advance a priority flip-flop in each enabling circuit similar to the priority flip-flop 3PR0 and enabling circuit EC0 so that these flip-flops now will be in their set state.

With all gating flip-flops in the enabling circuits reset, the gating amplifiers in tone gates TG0–TG32 are restored to their stand-by state so that the trunks connected to tone gates TG31–TG46 are coupled to detector 1 and the trunks connected to tone gates TG47–TG62 are all coupled to detector 2.

In the example described above, the call tracing tone was being transmitted over only one trunk so that during the process of dividing the trunks into smaller and smaller groups only one of the detectors 1 and 2 would operate. Whether or not the priority flip-flops in the enabling circuits, such as flip-flop 3PR0 in enabling circuit EC0, were in their set or reset state made no difference since the group having the trunk with the tone was always retained and divided in half while the other group was gated off.

If tone is transmitted simultaneously over two or more trunks, both detectors 1 and 2 will be actuated during some interval of the dividing process. Under these circumstances, the priority flip-flops in the enabling circuits will give preference to one group of trunks and gate off the other group even though one of the trunks in the latter group has a call tracing tone on it. For example, assume that all priority flip-flops are in their reset state and tone is being received at terminal 4 of tone gate TG31 from trunk 107 and at terminal 4 of tone gate TG62 from another trunk which has not been shown. Initially, AND gate 305 is enabled by a clock pulse and the outputs of the four stages of binary counter 300 when the binary counter is in its reset state. AND gate 305 partially enables AND gates 306 and 315 which are completely enabled when both detectors 1 and 2 are actuated by the presence of tone in both halves of the trunk group. With AND gates 306 and 315 enabled, both flip-flops 3FL0 and 3FR0 attempt to set but only flip-flop 3FR0 will be permitted to set.

Flip-flops 3FL0 and 3FR0 in their set state would each supply negative potential at their "0" outputs and these potentials are applied over conductors 340 and 341 to AND gates 342 and 343, respectively. Since priority flip-flop 3PR0 is in its reset state, it is furnishing a negative potential from its "1" output over conductor 344 to completely enable AND gate 343. When AND gate 343 is enabled, its output is transmitted over conductor 346 to reset the left flip-flop 3FL0. With flip-flop 3FR0 set and 3FL0 reset, the trunks connected to tone gates TG31–TG46 will be gated off. Thus, with the priority flip-flop in its reset state, the right flip-flop 3FR0 will be preferred and with the priority flip-flop in its set state, the left flip-flop 3FL0 will be preferred. The priority flip-flops in the other enabling circuits function in the same way when tone is detected simultaneously by both detectors during the dividing process as the binary counter 300 actuates the enabling circuits associated with each level of the matrix. As mentioned above, each reset pulse will change the priority flip-flops so that alternate halves of the trunk group are preferred on successive cycles.

While precautionary measures can be taken to make the system insensitive to noise or speech simulated tone, it is possible that momentary spurious signals might actuate one or both detectors and cause the control circuit to begin its hunting mode to ascertain the identity of the trunk having the spurious tone. Rather than have the system advance through a complete cycle, the control circuit is arranged to recycle if tone is no longer present after the actuation of any one of the enabling circuits.

For example, let it be assumed that tone is being received at input terminals 4 of tone gates TG31 and TG62 but the tone at input terminal 4 of tone gate TG62 is a momentary burst of noise while the tone transmitted to tone gate TG31 is a legitimate nuisance call tracing tone. Also, let it be assumed that the priority flip-flops are in their reset state so that upon the detection of tone by both detectors the trunks connected to detector 1 will be gated off and the trunks connected to detector 2 will be retained and divided in half with each half being coupled to one of the detectors.

Initially, both detectors 1 and 2 will operate and binary counter 300 will begin counting. As described above, both flip-flops 3FL0 and 3FR0 will attempt to set but since priority flip-flop 3PR0 is in its reset state, gating flip-flop 3FL0 will be reset. With flip-flop 3FR0 set, the gating amplifiers in tone gate TG0 are selectively enabled to block the input to terminals 1 and 2 of tone gate TG0 and couple the input on terminal 3 to output terminal 5 and the input on terminal 4 to the output terminal 6. In other words, the gating amplifiers of tone gate TG0 have gated off the trunk group having the nuisance call tracing tone and retained the trunk group having the spurious tone. When the retained trunk group is divided in half and each half is coupled to one of the detectors, it is likely that the spurious tone no longer will be present. In this case, AND gate 324 will be enabled by the binary counter to transmit a signal over conductor 333 to partially enable AND gates 347 and 348 in FIG. 3 and AND gate 516 in FIG. 5. Since the tone has disappeared and neither detector 1 nor 2 is now actuated, AND gates 347 and 348 are disabled and both gating flip-flops 3FL1 and 3FR1 remain in their reset state. With both flip-flops 3FL1 and 3FR1 in their reset state, negative potential is applied over conductors 3FL1–1, 3FR1–1, 514, and 515 to fully enable AND gate 516. AND gate 516 enables OR gate 209 over conductor 408 and OR gate 209 applies a reset pulse to conductors 208 and 203 to reset the binary counter 300 and the gating flip-flops. The reset pulse also changes the priority flip-flops, such as 3PR0, to their alternate (set) state and if the nuisance call tracing tone is still present on trunk 107, the arrangement will again begin its hunting mode with the left gating flip-flops 3FL0, 3FL1, et cetera being preferred.

Thus, it can be seen from the above description that if the tone disappears after a group of trunks is gated off, the arrangement immediately recycles and the preference circuit is altered to prefer selection from the other group of trunks.

Likewise, the arrangement is recycled if no tone is received during the high guard interval when detectors 1 and 2 are made more selective. More specifically, at the beginning of the high guard interval, when binary counter 300 advances to a point where its fourth stage is set, a negative potential is applied over conductor 335 to partially enable AND gate 211. If no tone is present, both relays 6DR1 and 6DR2 will be released and contacts 6DR1–2 and 6DR2–2 will be normal transmitting negative potential over conductors 212 and 213, respectively, to fully enable AND gate 211 at the next clock pulse. AND gate 211 enables OR gate 200 over conductor 214 and when enabled, OR gate 200 resets the control circuit as described above.

Figure 8:
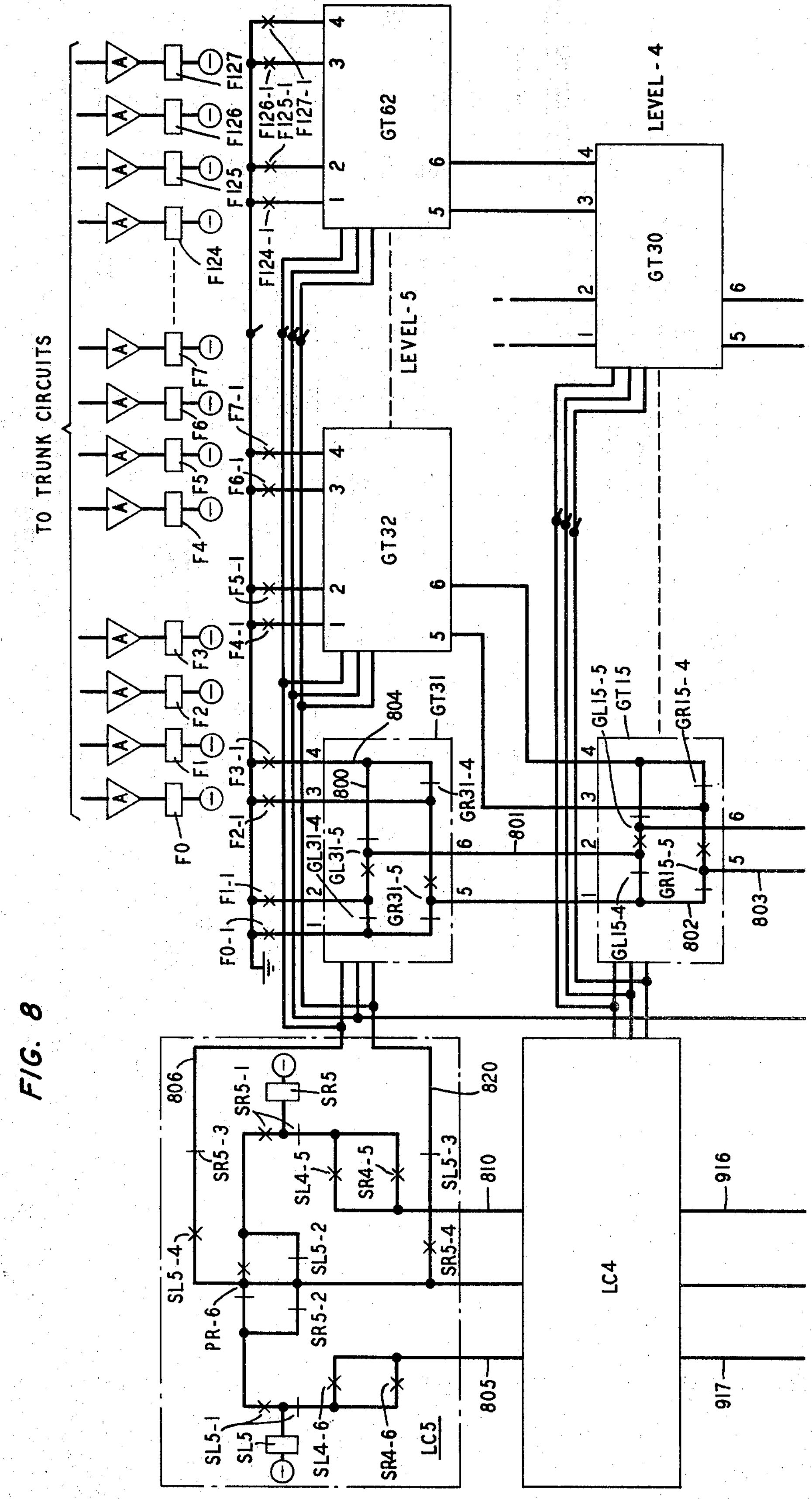
FIGS. 8–10, with FIGS. 8 and 9 arranged in accordance with FIG. 11, show in more detail a second embodiment of the same invention.
Figure 11:
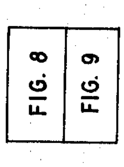
Figure 9:
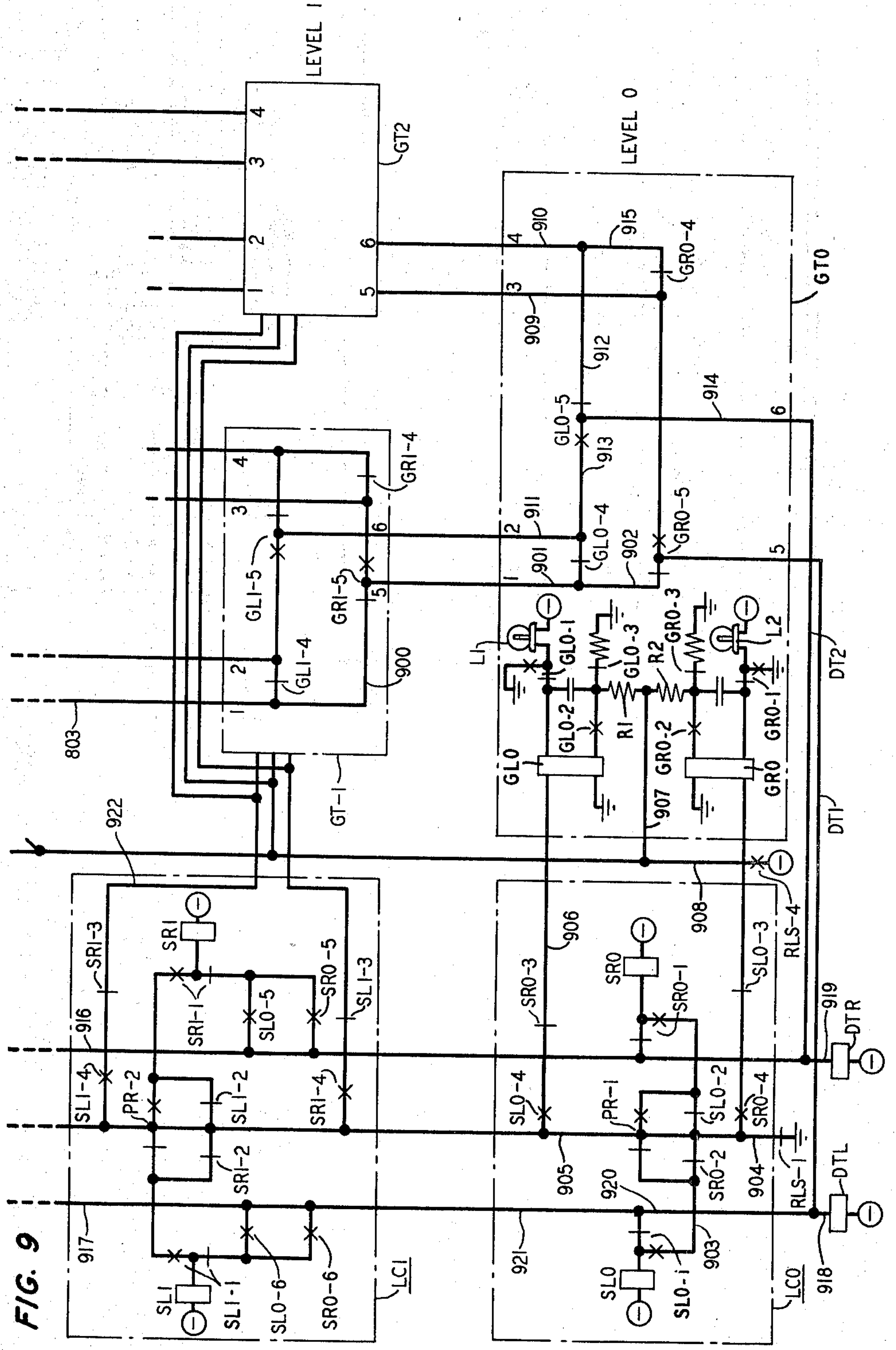
Figure 10:
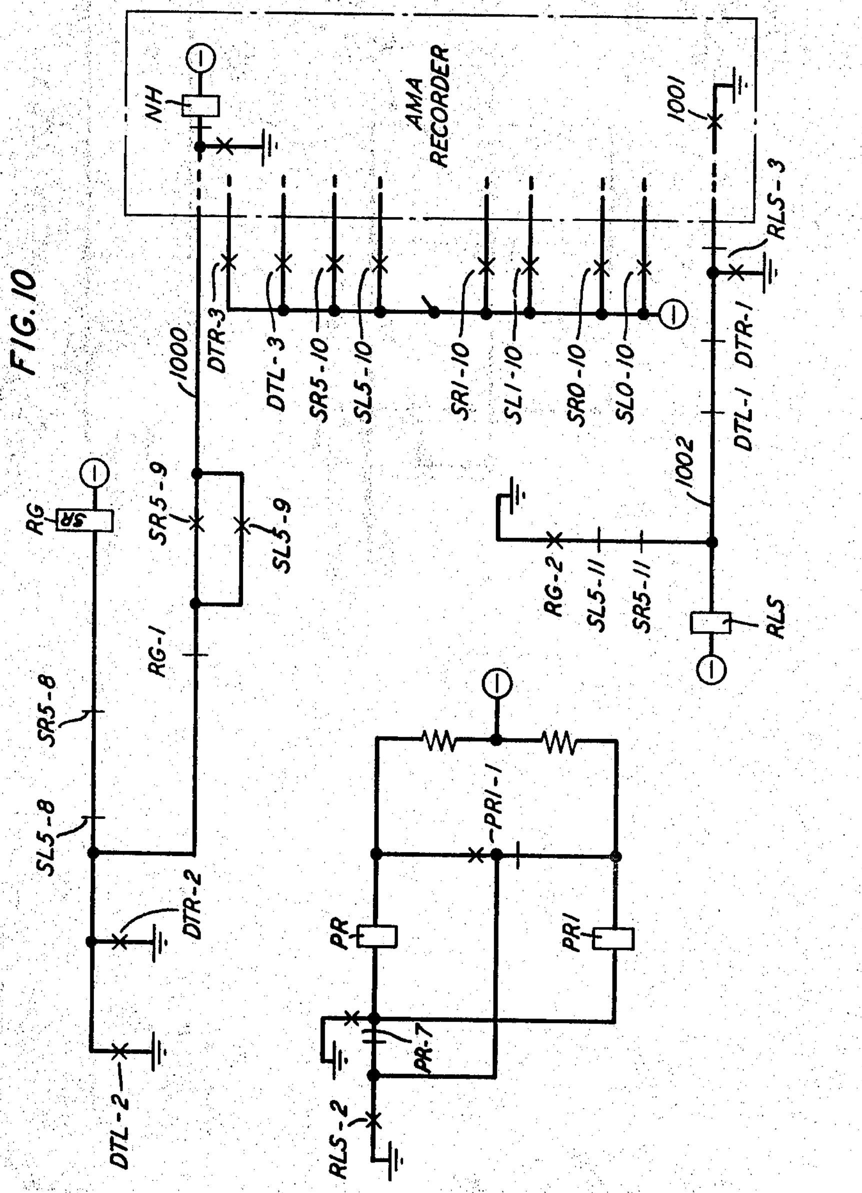

To illustrate how the invention can be practiced using other arrangements, I have included a second embodiment of the invention in FIGS. 8–10 of the drawing. FIGS. 8 and 9 when arranged according to FIG. 11 show another example of a gating matrix and control and detector circuitry which can be coupled to trunks to detect a nuisance call tracing tone as set forth in the prior embodiment.

Each trunk to be monitored is coupled to an amplifier A which is responsive only to the nuisance call tracing tone to operate an associated relay F–. The amplifier can be a tuned detector similar to the one described in the first embodiment of the invention as long as it has sufficient selectivity to discriminate against speech simulation of the tone being detected. The contacts of the various F– relays are connected to the input terminals 1–4 of gates GT31–GT62 of the gate matrix.

The gate matrix comprises a plurality of gates GT0–GT62 arranged in a tree-shaped configuration with the input to the matrix being connected to the contacts of the F– relays and the output being over the conductors DT1 and DT2 to the control and detector circuitry shown in the left-hand portion of FIGS. 8 and 9.

Gates GT0–GT62 are arranged in six levels and are capable of serving 128 trunk circuits. Corresponding to each level of the matrix is a logic circuit LC– which selectively actuates the left and right gating relays GL– and GR– in their associated gates in accordance with the output on conductors DT1 and DT2.

In its stand-by state, that is, when all trunks are being monitored, relays GL– and GR– in the gate circuits and relays SL– and SR– in the logic circuits are normal. With these relays normal, the trunks connected to amplifiers A are divided in half. More specifically, any of the trunks coupled to the relays F0 through F63 will cause a signal to be transmitted through the matrix and appear on output conductor DT1 while any of the trunks coupled to relays F64–F127 will cause a signal to be transmitted through the matrix and appear on output conductor DT2.

To illustrate the operation of the system, let it be assumed that a tone has been received over the trunk connected to relay F3 so that relay F3 operates. With relay F3 operated, ground is extended through the matrix to output conductor DT1 over a path including contacts F3–1, conductors 804 and 800, break contacts GL31–5, conductor 801, break contacts GL15–4, conductor 802, break contacts GR15–5, conductor 803 to FIG. 9, conductor 900, break contacts GR1–5, conductors 901 and 902, break contacts GR0–5 to output conductor DT1.

The ground from conductor DT1 is extended over conductor 918 and through the winding of relay DTL to battery operating relay DTL. Relay DTL completes a circuit in FIG. 10 through its contacts DTL–2 through break contacts SL5–8 and SR5–8 and through the winding of slow release relay RG to battery. Relay RG operates over this circuit and will hold operated until relay SL5 or SR5 operates in logic circuit LC5. Relay RG is made slow release to produce a timing interval before the identity of a trunk is recorded at the end of the matrix dividing process.

The ground on conductor DT1 from relay F3 is also extended over conductor 920, through break contacts SL0–1 and through the winding of relay SL0 to battery to operate relay SL0. Relay SL0 operates and locks over a circuit including its make contacts SL0–1, conductor 903, break contacts SR0–2, conductor 904, and break contacts RLS–1.

When relay SL0 operates, it closes its contacts SL0–4 to complete a circuit from ground at contacts RLS–1 over conductors 904 and 905, through make contacts SL0–4 and break contacts SR0–3, over conductor 906, through the upper winding of relay GL0 and through break contacts GL0–1 and lamp L1 to battery. Relay GL0 operates and lamp L1 lights over this circuit indicating in which group of trunks the tone was detected. Relays such as GL0, GR0, et cetera are of the magnetic latching type and will remain operated in the absence of current flow through their windings. At the end of the circuit operation a momentary reverse current flow will be introduced into the lower windings of these relays to release them.

Prior to the operation of relay GL0, the trunks coupled to the input terminals 3 and 4 of gate GT0 are connected through to the output terminal 6 and the trunks coupled to the input terminals 1 and 2 of gate GT0 are connected through to the output terminal 5. More specifically, input terminal 3 of gate GT0 was connected over conductor 909, through break contacts GR0–4, back over conductor 915 and conductor 912, through break contacts GL0–5 and over conductor 914 to output terminal 6 while input terminal 4 is connected over conductors 910 and 912, through break contacts GL0–5 and over conductor 914 to output terminal 6. With relay GL0 now operated, input terminals 3 and 4 are blocked from connection to output terminal 6 and the trunks connected to the gate matrix at gates GT47–GT62 are gated off. In addition, the input terminal 2 of gate GT0 is disconnected from output terminal 5 at break contacts GL0–4 and input terminal 2 is now connected over conductors 911 and 913, through make contacts GL0–5 and over conductor 914 to output terminal 6. The trunks connected to the matrix via gates GT31–GT46 are, therefore, divided in half with the trunks connected to tone gates GT31–GT38 being coupled to output DT1 of the matrix and the trunks connected to gates GT39–GT46 being coupled to output DT2.

Thus it can be seen that the gating circuits in this embodiment function in a manner similar to the tone gates described in the first embodiment as set forth in FIGS. 2–6.

Since relay F3 in FIG. 8 is still operated, indicating the presence of a tone, ground is once again extended through the matrix to output conductor DT1 over conductors 920 and 921, through make contacts SL0–6, break contacts SL1–1 and through the winding of relay SL1 to battery operating relay SL1 in logic circuit LC1. Relay SL1 operates contacts SL1–4 to extend ground from break contacts RLS–1 through break contacts SR1–3 and over conductor 922 to operate the left gating relay GL1 in gate GT1.

Gating relay GL1, in operating, actuates its contacts GL1–4 and GL1–5 to gate off the trunks connected to input terminals 3 and 4 of gate GT1 and transfer input terminal 2 from output terminal 5 to output terminal 6. This in effect blocks the output of those trunks connected to gates GT39–GT46 and divides the trunks connected to gate GT31–GT38 in half with the inputs of gates GT31–GT34 connected to output conductor DT1 and the inputs of gates GT35–GT38 connected to output conductor DT2.

Relays in logic circuits LC2, LC3, and LC4, similar to relay SL1 and logic circuit LC0, will operate in succession as long as relay F3 associated with the trunk having the nuisance call tone remains operated to connect ground to an input terminal of the matrix. When relay SL4 in logic circuit LC4 operates its operates the left gate relay GL15 in gate GT15 and this gates off the four trunks connected to gate GT32. The remaining trunks, that is, those trunks connected to gate GT31, are divided in half with the trunks associated with relays F0 and F1 being coupled to the output DT1 of the matrix and the trunks associated with relays F2 and F3 being coupled to the output DT2 of the matrix.

The ground from contacts F3–1 of relay F3 now will be coupled through the matrix to output conductor DT2 and extended over conductor 916 to FIG. 8, through logic circuit LC4 and over coductor 810, through make contacts SL4–5, through break contacts SR5–1 and through the winding of relay SR5 to battery. Relay SR5 operates and at its make contacts SR5–4 extends ground through break contacts SL5–3 over conductor 806 to gate circuit GT31 to operate the right gating relay GR31. Only certain of the contacts for relay GR31 have been shown and it will be understood that gate GT31 is similar to gate GT0 shown in more detail in FIG. 9.

With relay GR31 operated, the trunks associated with relays F0 and F1 are gated off. The contacts of relays F2 and F3 associated with the remaining two trunks are coupled to output terminals 5 and 6 of gate GT31 and terminals 5 and 6 are coupled through other gates to outputs DT1 and DT2, respectively, of the matrix. Relay F3 now will extend its ground through the matrix to output conductor DT2 over conductor 919 to operate relay DTR.

When relay SR5 operated, it opened its break contacts SR5–8 in FIG. 10 to begin the release of relay RG. Relay RG releases after a short interval and closes its break contacts RG–1 to extend ground through operated contacts SR5–9 and over start conductor 1000 to the automatic message counting recorder and through the winding of relay NH to battery, operating relay NH. Relay NH will cause the automatic message accounting equipment to record the information presented to it by contacts of relays SL0–SL5, SR0–SR5, DTL and DTR which indicate the identity of the trunk over which the call tracing tone was received. The operation of the automatic message accounting equipment is set forth in the above-identified Carpenter et al. patent. At the end the recording operation, ground is extended from contacts 1001 in the recorder over conductor 1002 and through the winding of release relay RLS to battery operating relay RLS. Relay RLS opens its contacts RLS–1 in FIG. 9 to release the relays SL– and SR– that have been operated. In addition, relay RLS closes its make contacts RLS–4 to energize the lower windings of relays GL– and GR–. When the lower windings of these magnetic latching relays are energized, the magnetic field of each latching device is canceled by the field produced by the lower winding and the relay releases.

Relay RLS will also operate prior to the actuation of logic circuit LC5 if ground is not present on either one of the matrix output conductors DT1 and DT2. With both relays DTL and DTR released, ground from operated contacts RG–2 will be extended through break contacts SL5–11, SR5–11 and through the winding of relay RLS to battery to operate relay RLS and restore the circuit to normal.

It will be recalled from the prior description of the first embodiment that when tone is received simultaneously over the trunks in both halves of the matrix, one-half of the matrix is gated off under control of a priority circuit. Similar provisions have been made in this embodiment. Turning now to FIG. 10, there is shown a binary counter comprising relays PR and PR1 which respond to each operation of release relay RLS. When relay RLS initially operates, it connects ground through normal contacts PR–7 and through the winding of relay PR to operate relay PR. At this time, ground is also connected to both sides of the winding of relay PR1 to prevent relay PR1 from operating. When relay RLS releases, the shunting ground is removed from relay PR1 and relay PR1 operates. Upon the next operation of relay RLS, relay PR1 is shunted through operated contacts PR1–1 and when relay RLS releases, relay PR1 also releases. Thus, relay PR is only operated during alternate operations of the system. The contacts PR–1 through PR–6 in the logic circuits LC0–5, respectively, prevent both the SL– and SR– relays from locking operated if ground is received simultaneously over both output conductors DT1 and DT2 of the matrix.

It is understood that the above-described arrangements are merely illustrative of the application and principles of the invention. Numerous other arrangements may be devised by those skilled in the art without departing from the spirit and scope of the invention.

I claim:

1. In a telephone system, an arrangement for monitoring groups of communication lines for the presence of a particular signal, said arrangement comprising a plurality of detectors each responsive to said particular signal, means for coupling each said line group to a different one of said detectors for identifying that group having a line containing said particular signal, control means actuated by said detectors for selectively enabling said coupling means for successively dividing said identified group into smaller groups and coupling the smaller groups to said detectors until the last-identified group contains only one line, and means actuated by said control means for recording the identity of the line in the last-identified group.

2. The invention defined in claim 1 wherein said control means comprises means for altering said detectors in accordance with the size of said line groups.

3. The invention defined in claim 1 wherein said coupling means comprises a plurality of gating means arranged in a matrix having input means coupled to said communication lines and output means coupled to said detectors.

4. The invention defined in claim 3 wherein each said gating means comprises input terminals for receiving said particular signal, output terminals each being connected to a portion of said input terminals and means responsive to control signals for rearranging the interconnection of said input and output terminals to block certain of said input terminals from connection to said output terminals.

5. The invention defined in claim 4 wherein said control means comprises means responsive to each said detector for transmitting a control signal to selectively actuate said gating means.

6. The invention defined in claim 5 wherein said matrix comprises said plurality of gating means arranged in a rank order of levels and means interconnecting the input terminals of lower ranked gating means to the output terminals of higher ranked gating means, and wherein said control signal transmitting means comprises a plurality of logic circuits each effective when actuated for transmitting control signals to said gating means of an associated matrix level and a sequence circuit for actuating said logic circuits in succession.

7. The invention defined in claim 6 wherein said control means further comprises means responsive to at least one of said logic circuits for altering the selectivity of said detectors.

8. The invention defined in claim 6 wherein each said logic circuit comprises a plurality of switching means each enabled by a different one of said detectors for transmitting a control signal to said associated gating means and priority circuit means for blocking the simultaneous enablement of more than one switching means in each logic circuit.

9. The invention defined in claim 6 wherein said control means also comprises means effective when none of said detectors are actuated for recycling said sequence circuit.

10. The invention defined in claim 8 wherein said control means also comprises means for transmitting said control signals to said recording means.

11. In a telephone system, an arrangement for monitoring a plurality of communication lines for a particular signal, said arrangement comprising a first and a second detector each actuable by said signal, a plurality of operable gating means for coupling the lines to said detectors, and control means responsive to the actuation of at least one of said detectors for selectively operating said gating means to lessen the number of lines being monitored, said control means also including priority means for determining the particular lines to be monitored upon simultaneous actuation of both of said detectors.

12. In a telephone system, the monitoring arrangement in accordance with claim 11, wherein said priority means also includes means for preferring alternate groups of said lines on successive operations of said control means.

13. In a telephone system, the monitoring arrangement in accordance with claim 11 wherein said control means also includes means responsive to actuation of neither of said detectors after actuation of one of said detectors and the operation of said gating means for resetting said control means to increase the number of lines being monitored.

14. In a telephone system, the monitoring arrangement in accordance with claim 13 wherein said priority means further includes means for determining the particular lines to be monitored on operation of said resetting means.

References Cited

UNITED STATES PATENTS 3,393,275 7/1968 Hopper ............ 179—18

3,385,933 5/1968 Abert et al. ......... 179—18

KATHLEEN H. CLAFFY, Primary Examiner

T. W. BROWN, Assistant Examiner